Patented May 13, 1947

UNITED STATES PATENT OFFICE 2,420,491

2,420,491

PROCESS FOR PREPARING PROGESTERONE

Russell Earl Marker, Mexico City, Mexico, and Elmer J. Lawson, East Greenbush, N. Y., assignors to Parke, Davis & Company, Detroit, Mich., a corporation of Michigan No Drawing. Original application January 4, 1941, Serial No. 373,192. Divided and this application May 24, 1944, Serial No. 537,202

2 Claims. (Cl. 260—397.3)

This invention relates to the preparation of keto steroids and is a division of our copending application, Serial No. 373,192, filed January 4, 1941.

This application relates more particularly to the preparation of certain pregnandione compounds and the conversion of the same into pregnenedione compounds. One of the objects of the invention is to provide an improved method for preparing progesterone. Another object is to prepare certain new intermediate compounds by new and improved methods.

We have found that a distinct difference exists in the reactivity of hydroxyl, ester, or ether groupings at carbon atoms 3 and 6 of the steroid molecule, in that the hydroxyl, ester, ether, or like grouping at carbon atom 3 is more reactive than a similar grouping at carbon atom 6, and consequently chemical change can be effected on the more reactive grouping at carbon atom 3, while leaving the grouping at carbon atom 6 substantially intact and unaffected. Thus, we prepare a 3-hydroxy-6-esterified steroid, then oxidize it to a 3-keto-6-esterified steroid and hydrolyze this to a 3-keto-6-hydroxy steroid. Either the 3-keto-6-hydroxy- or 3-keto - 6 - esterified-steroids, we find, on heating with or without acidic dehydrating agents, we smoothly transformed into 3-keto-$\Delta^4$-unsaturated steroids. This discovery is new and surprising and makes available hitherto inaccessible steroid intermediates useful in the preparation of therapeutically useful substances.

Suitable starting materials for the practice of our invention in order to produce steroids of the pregnane series are, for example, pregnanone-20-diol-3,6 and pregnandione-6,20-ol 3 and the like.

When the starting material is pregnanone-20-diol-3,6, it is treated with a quantity (two moles or more) of an esterifying agent sufficient to convert both hydroxyl groups to the corresponding ester derivative.

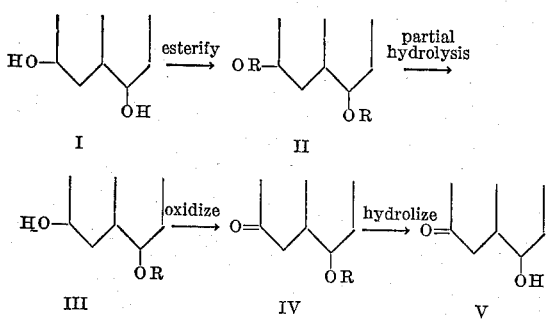

O R=an acid radical

This substance (II) is then subjected to a partial saponification procedure whereby the steroid is reacted with a saponifying agent insufficient in amount and/or strength to rupture the ester linkages attached to both carbon atoms 3 and 6, and therefore, in accordance with our discovery, ruptures only, or mainly the ester linkage attached to carbon atom 3, leaving the ester linkage attached to carbon atom 6 largely unaffected. The hydroxyl group attached to carbon atom 3 in the resulting half-ester (III) is oxidized under relatively mild oxidizing conditions to a carbonyl group, without affecting the ester linkage to carbon atom 6, by treatment with an oxidizing agent capable of converting a secondary hydroxyl into a carbonyl group. The keto-ester (IV) thus formed may then be saponified to yield a hydroxy-ketone (V) of the type made available by our invention.

Again, the 3,6-dihydroxy steroid (I) may be treated in the practice of our invention, by a somewhat different procedure, in that it is first subjected to a partial esterification or partial etherification process which has the effect of mainly esterifying or etherifying the hydroxyl group at carbon atom 3, yet leaving the hydroxyl group at carbon atom 6 substantially unaffected. This process is achieved by treating the 3-6-dihydroxy-steroid with an amount of an esterifying or etherifying agent insufficient in amount and/or strength to attack both the 3- and 6-hydroxyl groups.

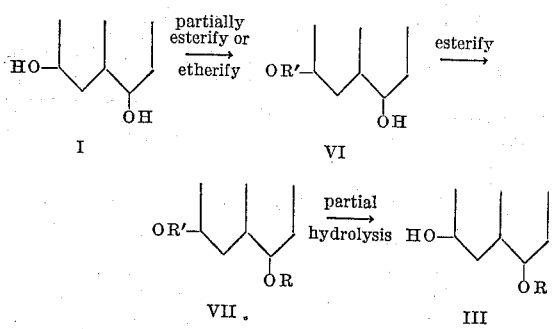

O R=an acid radical
O R'=O R, or an ether radical

This partial-ester or -ether (VI) is then treated further with an esterifying agent in order to completely esterify the hydroxyl group at carbon atom 6 of the partial-ester or -ether. The latter step may be conducted so that the hydroxyl groups at carbon atoms 3 and 6 are protected by the same group OR, but we prefer to further esterify so as to prepare a so-called mixed ester or ester-ether (VII), in which the group at carbon atom 3 is of a more labile character and therefore more readily saponifiable than the group at carbon atom 6. For example, when the ester group at carbon atom 3 is derived from a stronger acid than the group linked to carbon atom 6, then it is certain that the group at C₃ will be hydrolyzed first. This mixed ester, or ester-ether (VII) is then subjected, as already described for the case of the simple 3,6-di-esterified steroid (II), to the procedures of partial hydrolysis, oxidation, and hydrolysis outlined in the previous paragraph.

When the starting material is pregnandione-6,20-ol 3, it may be reduced by catalytic hydrogenation or the action of nascent hydrogen, or by similar methods, to the corresponding 3,6-dihydroxysteroid (I) and this treated in accordance with the method previously described. Another and preferable procedure is to subject the 3-hydroxy-6-keto-steroid to an esterifying or -etherifying process, preferably thus introducing a rather labile group at carbon atom 3 before reducing the 6-keto group to hydroxyl.

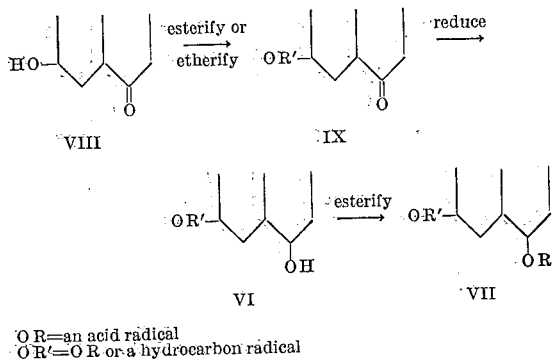

OR=an acid radical
OR'=OR or a hydrocarbon radical

The 3-esterified or 3-etherified-6-keto-steroid (IX), is then reduced so as to convert the carbonyl oxygen group at carbon atom 6 to a hydroxyl group. This 3-esterified-(or -etherified-) 6-hydroxy-steroid (VI) is then further esterified to produce compound (VII) and then subjected, as already described for the case of the simple 3,6 di-esterified steroid (II), to the procedures of partial hydrolysis, oxidation and hydrolysis to produce successively the compounds (III), (IV) and (V).

The 3-keto-6-hydroxy-steroids (V) or their esters (IV) as thus prepared are converted into 3-keto-4-unsaturated ketones (X) by subjecting them to heat and/or acidic dehydration treatments.

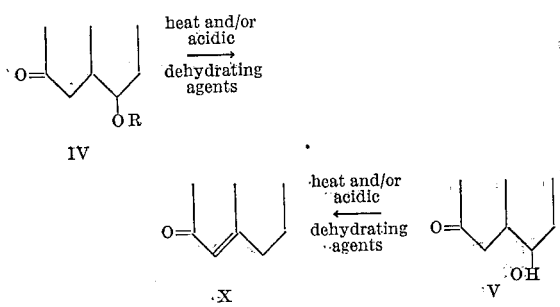

The following are specific examples of our invention:

*Example 1*

To 0.9 g. of 3,6-diacetoxypregnanone-20 (pregnanediol-3α, 6-one-20 diacetate), M. P. 100° (prepared according to the directions of copending application, Serial No. 359,162, of Russell Earl Marker filed Sept. 30, 1940) in 200 cc. of methanol at 20° is added 42 cc. of methanolic potassium hydroxide containing 0.8 mole of base per mole of ketone. After the solution has stood for forty-eight hours it is exactly neutralized with 1.70 cc. of 0.96 N sulfuric acid, and the solvents completely removed in vacuo. The oily residue is oxidized for one hour at room temperature in 25 cc. of acetic acid with a solution of 5 cc. of 90% acetic acid containing 0.5 g. of chromic oxide. Water is added, the precipitate extracted with ether, and the ethereal extract washed and concentrated to a small volume. Addition of pentane causes the separation of white prisms of 6-acetoxypregnanedione-3,20, M. P. 182°.

*Example 2*

The 6-acetoxypregnanedione obtained above is refluxed with 40 cc. of 2% methanolic potassium hydroxide for seventy-five minutes. Water is added and the organic material extracted with ether. The ethereal solution is washed with water and then evaporated to dryness. The solid remaining is covered with 5.0 g. of fused potassium bisulfate, and then heated in an oil pump vacuum at 130° for an hour and a half. The temperature is then gradually raised to 180° for four hours. The distilled substance collected on a cold finger is dissolved in ether. The ethereal solution, on evaporation, leaves a pale mobile oil, which, when seeded with progesterone crystallizes from acetone-water to yield greasy crystals. Recrystallization from ether-pentane produces little white crystals of progesterone of M. P. 120°, which give no depression in melting point with an authentic sample.

In the step (I→II) there may be used, besides acetic anhydride, other acylating agents derived from organic or inorganic acids such as p-toluenesulfonyl chloride, ketene, propionic anhydride, formic acid, cerbamyl chloride, phthalic anhydride, benzoyl chloride, furoyl chloride, stearoyl chloride, and the like. The reaction may sometimes be carried out by simple admixture of the reactants, but usually it is preferable to use a solvent such as an excess of the acylating agent, or its related acid, or a tertiary base such as pyridine, or an inert solvent like chloroform or benzene.

The partial hydrolysis (II→III, or VII→III) may be conducted using instead of potassium hydroxide or potassium bicarbonate, other basic reagents such as sodium hydroxide, barium hydroxide, sodium carbonate, ammonium hydroxide, or the like, and there may be used as solvents other media than methanol, such as water, acetone, dioxane, alcohol, the monomethyl ether of ethylene glycol, benzene, or mixtures thereof. Instead of an alkaline hydrolytic agent there may also be employed an acidic hydrolytic reagent such as p-toluenesulfonic acid, sulfuric acid or hydrochloric acid. The essential feature of this step is the use of hydrolytic agents and/or conditions sufficiently mild so that only partial hydrolysis occurs, whereupon, as we have found, there is produced the 3-hydroxy-6-esterified steroid.

Likewise, the essential feature of the partial esterification or etherification (I→VI) is the use of reagents and/or conditions so mild that only partial esterification or etherification occurs, yielding, as we have discovered, the 3-esterified- or -etherified-6-hydroxy-steroids. Instead of triphenylmethyl chloride and pyridine there may be used other reagents and solvents such as other etherifying agents or the acylating agents mentioned for the step I→II.

The methods of conducting steps VIII→IX, IX→VI, VI→VII, and IV→V are susceptible to variations which in view of what has already been shown will be understandable to those skilled in the art. Thus instead of acylating with formic acid and then catalytically hydrogenating, the steroid (VIII) may, for example, be tritylated the carbonyl group of (IX) reduced with sodium and alcohol, and the esterification accomplished by methods already discussed, avoiding acidic media because of the readiness with which the trityl group is removed by acids. The oxidation of III is preferably accomplished by the use of chromic acid in acetic acid solution, but other reagents such as the combination of acetone and aluminum ter-butylate may also be employed. The use of the latter is especially advisable if double bonds are present in the side chain attached to C—17, for here chromic acid or similar vigorous oxidizing agents tend to attack the double bond. However, such vigorous reagents may be employed if the double bond is intermediately protected by the addition of bromine prior to oxidation. The bromine may be removed after the oxidation by heating with zinc and acetic acid according to known methods. While the hydrolysis of the resulting ester (IV) ordinarily is satisfactorily accomplished by the use of basic reagents like potassium hydroxide or barium hydroxide, in some instances it is preferable to hydrolyze in the presence of acids like p-toluenesulfonic acid or hydrochloric acid.

The step (IV→X, or V→X) of preparation of the 3-keto-$\Delta^4$-unsaturated steroid is best done at 120–250° C. and preferably in the presence of an acidic dehydrating agent such as potassium bisulfate, zinc chloride, p-toluenesulfonic acid or anhydrous copper sulfate. However, if esters of 3-keto-6-hydroxysteroids like the benzoate or furoate are employed, the acidic dehydrating agent may be omitted, simple heating then serving to cause the transformation (IV→X or V→X).

The modes of isolation and purification of the products of this invention are not limited to those specifically described, for there may be used any of the techniques known to the art such as crystallization, distillation, chromatographic adsorption, preparation of derivatives of favorable properties, and the like.

What we claim as our invention is:

1. The process for preparing progesterone which comprises subjecting a pregnane compound having the formula

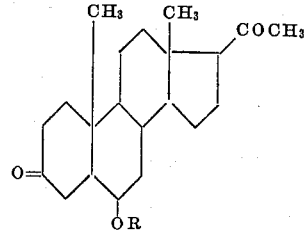

where —OR is a member of the class consisting of —OH and groups hydrolyzable to —OH, to the action of heat, with the elimination of HOR, thereby forming progesterone having the formula

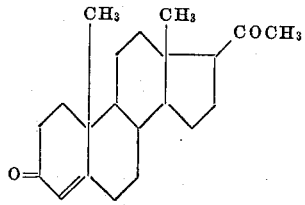

2. The process for preparing progesterone which comprises subjecting a pregnane compound having the formula

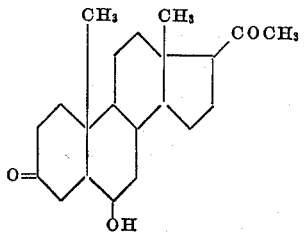

to the action of heat, with the elimination of HOR, thereby forming progesterone having the formula

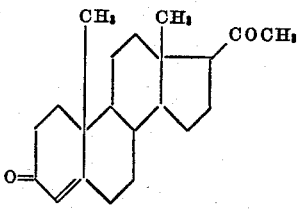

RUSSELL EARL MARKER.
ELMER J. LAWSON.